US010057614B2

(12) United States Patent
Hwang et al.

(10) Patent No.: US 10,057,614 B2
(45) Date of Patent: Aug. 21, 2018

(54) APPARATUS AND METHOD FOR PROVIDING ADAPTIVE MULTIMEDIA SERVICE

(75) Inventors: Sung-Oh Hwang, Yongin-si (KR); Doug-Young Suh, Seongnam-si (KR); Kyung-Mo Park, Seoul (KR); Yong-Hun Lee, Suwon-si (KR); Jun-Oh Kim, Suwon-si (KR); Jae-Yeon Song, Seoul (KR); Yong-Il Kwon, Incheon (KR)

(73) Assignees: Samsung Electronics Co., Ltd., Suwon-si (KR); University-Industry Cooperation Group of Kyung Hee University, Yongin-si (KR)

( * ) Notice: Subject to any disclaimer, the term of this patent is extended or adjusted under 35 U.S.C. 154(b) by 4 days.

(21) Appl. No.: 13/495,480

(22) Filed: Jun. 13, 2012

(65) Prior Publication Data

US 2012/0324490 A1 Dec. 20, 2012

(30) Foreign Application Priority Data

Jun. 14, 2011 (KR) .................. 10-2011-0057681

(51) Int. Cl.
*H04N 21/258* (2011.01)
*H04N 21/24* (2011.01)
(Continued)

(52) U.S. Cl.
CPC ... *H04N 21/25891* (2013.01); *H04N 21/2393* (2013.01); *H04N 21/24* (2013.01);
(Continued)

(58) Field of Classification Search
USPC .......................................... 725/81
See application file for complete search history.

(56) References Cited

U.S. PATENT DOCUMENTS

2002/0147828 A1* 10/2002 Chen ................. H04W 28/24
709/231
2003/0067942 A1 4/2003 Altenbernd et al.
(Continued)

FOREIGN PATENT DOCUMENTS

EP 1 187 485 A1 3/2002
EP 1 209 860 A1 5/2002
(Continued)

OTHER PUBLICATIONS

Ranga S. Ramanujan et al., Adaptive Streaming of MPEG Video over IP Networks, Nov. 2, 1997, pp. 398-409, XP010252445, DOI: 10.1109/LCN.1997.631009, ISBN: 978-0-8186-8141-7, Architecture Technology Corporation, Minneapolis, MN, USA.

*Primary Examiner* — Justin Shepard
(74) *Attorney, Agent, or Firm* — Jefferson IP Law, LLP

(57) ABSTRACT

An apparatus and a method for providing an adaptive multimedia service in a mobile communication system are provided. The method of providing a multimedia service includes collecting user-preference-aware information, device-capability-aware information, and network-aware information, generating a packet according to a correlation among the user-preference-aware information, the device-capability-aware information, and the network-aware information, and providing a multimedia service according to the generated packet.

4 Claims, 4 Drawing Sheets

(51) Int. Cl.
  *H04N 21/61* (2011.01)
  *H04N 21/63* (2011.01)
  *H04N 21/6373* (2011.01)
  *H04N 21/633* (2011.01)
  *H04N 21/6338* (2011.01)
  *H04N 21/6371* (2011.01)
  *H04N 21/60* (2011.01)
  *H04N 21/637* (2011.01)
  *H04N 21/239* (2011.01)
  *H04N 21/472* (2011.01)

(52) U.S. Cl.
  CPC ..... *H04N 21/2401* (2013.01); *H04N 21/2402* (2013.01); *H04N 21/2407* (2013.01); *H04N 21/2408* (2013.01); *H04N 21/25825* (2013.01); *H04N 21/47202* (2013.01); *H04N 21/60* (2013.01); *H04N 21/61* (2013.01); *H04N 21/6106* (2013.01); *H04N 21/6125* (2013.01); *H04N 21/6131* (2013.01); *H04N 21/6156* (2013.01); *H04N 21/6175* (2013.01); *H04N 21/6181* (2013.01); *H04N 21/63* (2013.01); *H04N 21/633* (2013.01); *H04N 21/637* (2013.01); *H04N 21/6338* (2013.01); *H04N 21/6371* (2013.01); *H04N 21/6373* (2013.01)

(56) References Cited

U.S. PATENT DOCUMENTS

| | | | |
|---|---|---|---|
| 2006/0095944 A1* | 5/2006 | Demircin et al. | 725/81 |
| 2006/0268933 A1* | 11/2006 | Kellerer et al. | 370/469 |
| 2007/0067807 A1 | 3/2007 | O'Neil | |
| 2007/0192795 A1 | 8/2007 | Kellner et al. | |
| 2007/0217339 A1 | 9/2007 | Zhao | |
| 2008/0037521 A1* | 2/2008 | Gutierrez et al. | 370/352 |
| 2009/0003434 A1 | 1/2009 | Song et al. | |
| 2009/0154426 A1* | 6/2009 | Perraud | H04W 36/26 370/332 |
| 2010/0020756 A1* | 1/2010 | Kennedy | 370/329 |
| 2011/0106911 A1 | 5/2011 | Sung et al. | |

FOREIGN PATENT DOCUMENTS

| | | |
|---|---|---|
| EP | 1 670 209 A1 | 6/2006 |
| KR | 10-2005-0109719 A | 11/2005 |
| KR | 10-0757057 B1 | 9/2007 |
| WO | 2004/112335 A1 | 12/2004 |
| WO | 2009/032214 A2 | 3/2009 |

* cited by examiner

APPARATUS AND METHOD FOR PROVIDING ADAPTIVE MULTIMEDIA SERVICE

PRIORITY

This application claims the benefit under 35 U.S.C. § 119(a) of a Korean patent application filed in the Korean Industrial Property Office on Jun. 14, 2011 and assigned Serial No. 10-2011-0057681, the contents of which are hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd., and 2) University-Industry Cooperation Group of Kyung Hee University.

BACKGROUND OF THE INVENTION

1. Field of the Invention:

The present invention relates to a mobile communication system. More particularly, the present invention relates to an apparatus and a method for providing an adaptive multimedia service in a mobile communication system.

2. Description of the Related Art:

A multimedia service refers to a conversational service such as a video telephony service, a streaming service such as a Video On Demand (VOD) service, a multicast service, a broadcast service, and the like. Meanwhile, a real time multimedia service can be divided into the conversational service, an interactive service, and the streaming service according to a service type. Further, the real time multimedia service can be divided into a unicast service, the multicast service, and the broadcast service according to a number of participants in a service.

Here, in order to support multimedia services such as the conversational service and the VOD service, Quality of Service/Quality of Experience (QoS/QoE) should be adaptively controlled according to a network state. Network-aware information for supporting such a multimedia service may contain an available bit-rate, a packet loss ratio, a delay, a jitter, information on a state of a router buffer or a reception buffer, and the like. For example, a delay and a packet loss ratio measured as a result of an Real Time Transport Protocol (RTCP) which is a real time control packet transport protocol, or a result measured in an Medium Access Control (MAC) layer of a Wireless Local Area Network (WLAN) or a 3rd Generation Partnership Project (3GPP) RAN may be included in the network-aware information.

A method of expressing the network-aware information is already utilized. In general, network-aware information using the RTCP is currently used. However, because the RTCP measures a result generated based on a state of a lower layer such as a MAC/PHY layer, the RTCP has a long delay and a measured value may not be accurate in showing the network state. Accordingly, directly using MAC/PHY layer information is more efficient than using the currently used RTCP to obtain network-aware information. The MAC/PHY layer has a disadvantage of being a part of an entire end-to-end path, but whole service quality is determined by the last link quality, so that last link information is dominant.

MAC/PHY layers such as layers using WiFi, 3G, 4G, and WiMAX which are widely used have a quite quick feedback and provide accurate information, but provided network-aware information has not been yet unified.

Therefore, a need exists for an apparatus and a method for effectively providing an adaptive multimedia service by unifying network-aware information through a definition of integrated abstract layer information and an expression method.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide an apparatus and a method for effectively providing an adaptive multimedia service by unifying network-aware information through a definition of integrated abstract layer information and an expression method.

Another aspect of the present invention is to provide an apparatus and a method for effectively providing an adaptive multimedia service by providing an integrated abstract layer which can exchange information with an application layer and a lower layer.

Another aspect of the present invention is to provide an apparatus and a method for providing an adaptive multimedia service in consideration of user-preference-aware information, network-aware information, and device-capability-aware information.

In accordance with an aspect of the present invention, a method of providing a multimedia service is provided. The method includes collecting user-preference-aware information, device-capability-aware information, and network-aware information, generating a packet according to a correlation among the user-preference-aware information, the device-capability-aware information, and the network-aware information, and providing a multimedia service according to the generated packet.

In accordance with another aspect of the present invention, an apparatus for providing a multimedia service is provided. The apparatus includes a memory for storing user-preference-aware information, device-capability-aware information, and network-aware information, and a controller for generating a packet according to a correlation among the user-preference-aware information, the device-capability-aware information, and the network-aware information, and for providing a multimedia service according to the generated packet.

In accordance with another aspect of the present invention, a portable terminal for receiving a multimedia service over a network is provided. The terminal includes a communication unit for transmitting across a network user-preference-aware information and device-capability-aware information to a server connected to the portable terminal through the network, and for receiving generated packets from the server, wherein the generated packets correspond to multimedia packets generated according to a correlation among the user-preference-aware information, the device-capability-aware information, and network-aware information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
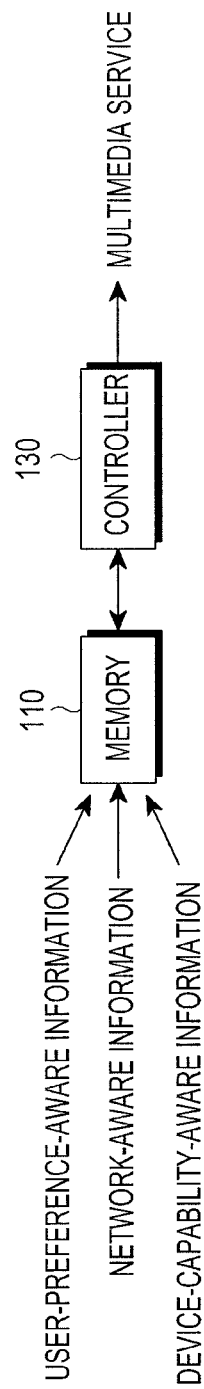
FIG. 1 illustrates a method of providing an adaptive multimedia service according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention suggest types of parameters unified by abstracting Medium Access Control/Physical (MAC/PHY) layer information and a scheme for expressing the parameters. For example, it is possible to achieve a Cross Layer Optimization (CLO) by using Network Abstraction for MPEG Media Transport (NAM) information provided by exemplary embodiments of the present invention. The CLO refers to providing an adaptive multimedia service by recognizing a network state and performing a network-aware video coding. Further, exemplary embodiments of the present invention suggest a method of unifying schemes for expressing parameters of user-preference-aware information and device-capability-aware information.

If a user controls a media Quality of Service (QoS) like a Dynamic Adaptive Streaming over HTTP (DASH) which is being standardized in a Moving Picture Experts Group (MPEG), then the user can use the abstracted cross-layer QoS parameters. If a server controls the media QoS, then the abstracted cross-layer QoS parameters can be transferred to another device through an RTSP extended header. Further, network resources can be efficiently distributed by providing information on a unit price per byte which is one of the user-preference-aware information.

The abstracted cross-layer QoS method provided by exemplary embodiments of the present invention is being currently standardized in an MPEG system group under the name of Bulletin Board for Network Abstraction for MMT (NAMB). An MPEG Media Transport (MMT) is due to be included in MPEG-H Part. 1 (system part) on January, 2013 as a standard, and various technologies are being currently standardized together with the NAMB provided by exemplary embodiments of the present invention.

Before the detailed description of exemplary embodiments of the present invention, a basic concept of exemplary embodiments of the present invention will be described with reference to FIG. 1.

An aspect of exemplary embodiments of the present invention provides device-capability-aware information, network-aware information, and user-preference-aware information for generating adaptive multimedia service data, and provides a scheme of integrating different context-aware information pieces if the different context-aware information pieces have the correlation.

FIG. 1 illustrates a method of providing an adaptive multimedia service according to an exemplary embodiment of the present invention.

Referring to FIG. 1, a memory (i.e., context-pool) 110 stores context-aware information including device-capability information, network-aware information, and user-preference-aware information for generating adaptive multimedia data. Further, a controller 130 integrates the device-capability-aware information, the network-aware information, and the user-preference-aware information to provide the adaptive multimedia service.

Hereinafter, parameters defining the device-capability-aware information, the network-aware information, and the user-preference-aware information will be described.

Figure 2:
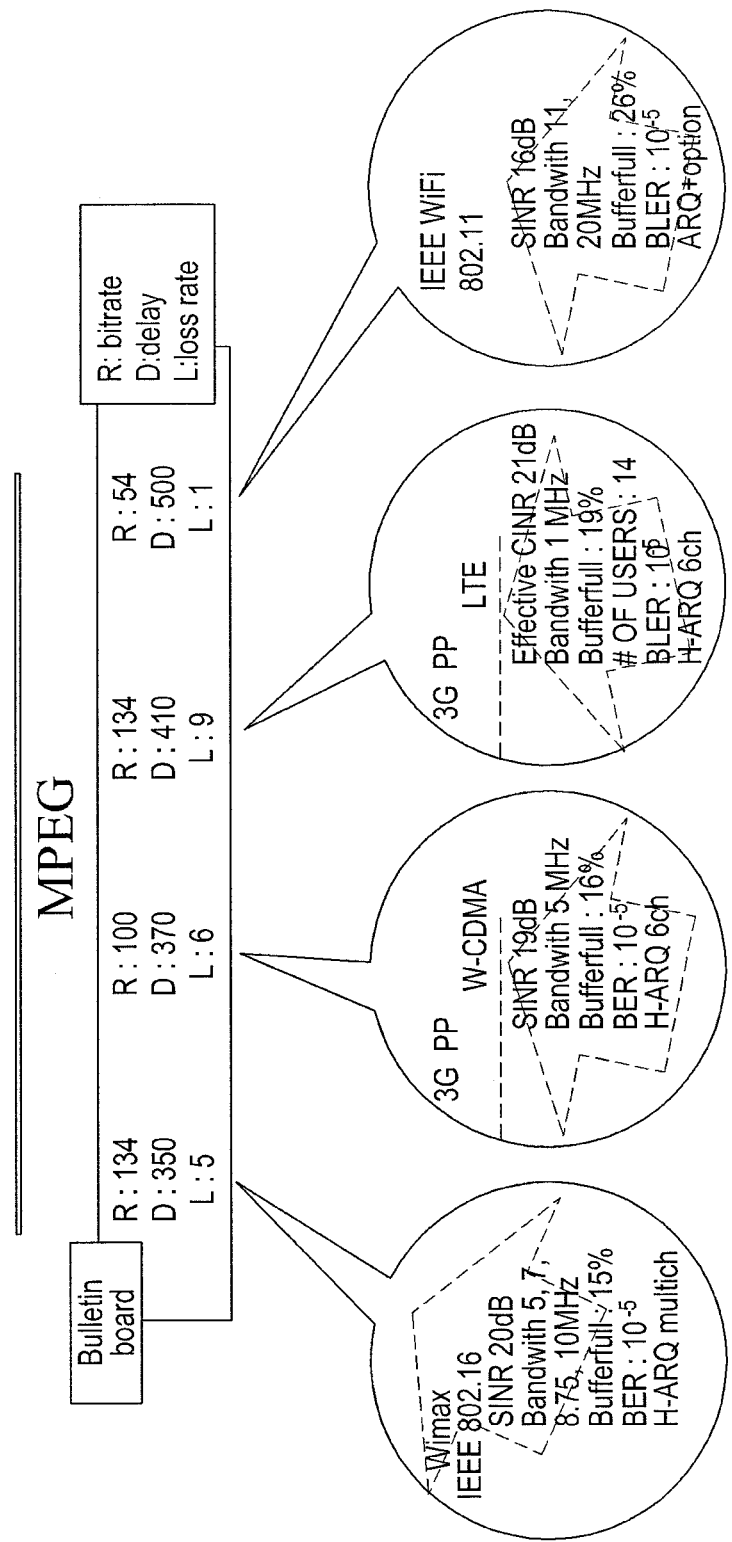
FIG. 2 illustrates a cross-layer Quality of Service (QoS) method according to an exemplary embodiment of the present invention.

FIG. 2 illustrates a cross-layer QoS method according to an exemplary embodiment of the present invention. That is, FIG. 2 shows a process of using network-aware information abstracted by a lower MAC/PHY layer. Here, a method of receiving the abstracted network-aware information from the lower MAC/PHY layer will be described with reference to FIG. 3.

Information on different networks (WiFi, WiMAX, 3G, and the like) is abstracted as parameters (i.e., cross-layer QoS parameters) integrated through each abstract process. The abstract process is achieved through an inherent method in each network, and an application layer uses the abstracted cross-layer QoS parameters regardless of types of networks. For example, the abstracted cross-layer QoS parameters are integrated into a parameter of tSpec or parameters of an RTCP used in a conventional technology for maintaining the compatibility.

In order to use the cross-layer QoS method, the difference according to an MAC/PHY layer scheme in interfaces between a media layer which is a higher layer and a network which is a lower layer should be compensated. Exemplary embodiments of the present invention overcome the above problem which is the difference in the interfaces between mutual layers by providing types of tSpec parameters. More specifically, the abstracted cross-layer QoS parameters in an aspect of the network receive parameters abstracted in a form of a token bucket rate, a peak data rate, a frame size of tSpec of an RSVP of an Internet Engineering Task Force (IETF) instead of parameters (e.g., SNR, SINR, CNR, CINR) provided by different network channels (e.g., WiFi, 3GPP, WiMAX, and the like). The abstract process varies depending on each network channel, and exemplary embodiments of the present invention propose syntaxes and semantics of the abstracted parameters. According to exemplary embodiments of the present invention, a place for storing the abstracted cross-layer QoS parameters is called the NAMB. The NAMB is being actively standardized in a system part of the MPEG at present as described above.

The cross-layer QoS parameters corresponding to the network-aware information provided by exemplary embodiments of the present invention include one or more of an available bit-rate, a jitter, information on a state of a router buffer or a reception buffer, and a delay parameter and a loss parameter which are sensitive parameters for a multimedia service. Here, the delay parameter and the loss parameter keep the compatibility by using the definition in the RTCP.

tSpec parameters and RTCP parameters syntax used for the compatibility in the NAMB are defined as provided, for example, in Table 1 below, and semantics defined in Table 1 are as follows. Because a name and a size of each field, and a parameter type indicating each field are selected in consideration of functions of exemplary embodiments of the present invention as described above, the name, the size, and the parameter type associated with each field may vary depending on an intention of a user or an operator, a precedent and the like. However, semantics of each field should follow the definition provided by this specification.

TABLE 1

| Field | Type | size (bits) |
| --- | --- | --- |
| channel_id | unsigned integer | 6 |
| token_bucket_rate | float | 32 |
| token_bucket_size | float | 32 |
| peak_data_rate | float | 32 |
| maximum_delay | float | 32 |
| frame_size | unsigned integer | 32 |
| frame_loss_ratio/ lost_frame_number | float/unsigned integer | 32 |

A description of each field included in Table 1 is provided below.
- channel_id: refers to an identifier for distinguishing each transport network and a session.
- token_bucket_rate: refers to a field indicating information on an average bit-rate which can be guaranteed by the MAC/PHY layer and expressing the bit-rate in the unit of kilobits per seconds.
- token_bucket_size: expresses a token bucket depth of a buffer existing in the MAC/PHY layer in the unit of kilobits.
- peak_data_rate: means an instantaneous maximum available bandwidth which can be provided by the MAC/PHY.
- maximum_delay: refers to a field indicating a maximum transport delay time and expressing the delay time in the unit of milliseconds.
- frame_size: refers to a field indicating a frame size which is a transport unit in the MAC/PHY layer and expressing the frame size in the unit of kilobits.
- frame_loss_ratio/lost_frame_number: refers to a field indicating a loss ratio (or a number of lost frames) of a frame unit measured in the MAC/PHY layer.

Meanwhile, there are three schemes for indicating the information configuring the network-aware information. A first scheme corresponds to a method of using an absolute value. In an example of the first scheme, token_bucket_size is used in the unit of kilobits. A second scheme corresponds to a method of indicating the information as a relative value for a reference value. For example, if token_bucket_size is changed from 500 kilobits to 400 kilobits, token_bucket_size is expressed as 80%. A third scheme corresponds to a method using a changing rate of corresponding information. For example, according to a third scheme, an amount which has been changed for corresponding information at a previous time point is indicated.

Table 2 below defines an example of a syntax when tSpec parameters and RTCP parameters used for the compatibility in the NAMB are expressed by a changing rate/changing amount, and semantics defined in Table 2 are as follows.

TABLE 2

| Field | Type(difference/ differential rate) | size (bits) |
| --- | --- | --- |
| changed_token_bucket_size | float/float | 32 |
| changed_data_rate | float/float | 32 |
| changed_maximum_delay | float/float | 32 |
| changed_frame_size | unsigned integer/float | 32 |
| changed_frame_loss_ratio/ changed_lost_frame_number | float/float//unsigned integer/float | 32 |

A description of each field included in Table 2 is provided below.
- changed_token_bucket_size: indicates a token bucket depth of a buffer in a changed MAC/PHY layer as a changing rate (%) or a changing amount.
- changed_data_rate: expresses an available bandwidth which can be provided by the changed MAC/PHY layer as a changing rate (%) or a changing amount.
- changed_frame_size: expresses a size of a frame which is a transport unit in the changed MAC/PHY layer as a changing rate (%) or a changing amount.
- changed_frame_loss_ratio/changed_lost_frame_number: expresses a loss rate (or number of lost frames) of a frame unit in the MAC/PHY layer as a changing rate (%) or a changing amount.

The network-aware information refers to information on a state of a network when a user receives a multimedia service. A multimedia transport service can vary depending on multimedia data service schemes according to a type or a state of the network. For example, according to exemplary embodiments of the present invention, different parameters provided by different channels (e.g. WiFi, 3GPP, WiMAX, etc.) in the MAC/PHY are unified with QoS parameters which are widely used at present and thus the compatibility is achieved by introducing a concept of a cross-layer design and a concept of an abstract as a concept of the abstracted cross-layer QoS parameters. By abstracting MAC/PHY QoS parameters of different channels to have types of tSpec parameters of RSVP such as a token bucket rate, a peak data rate, a frame size, and the like, the parameters of different channels are used equally to the QoS parameters widely used at present.

In an exemplary embodiment of the present invention, parameters used in a higher layer to know a network state in the higher layer are predetermined. However, due to the difference between the above parameters and parameters in the network, there is no method by which the network state can be exactly recognized. In order to compensate for such a problem, the parameters are unified into the abstracted network information type so that the higher layer can directly know lower layer information (network state) regardless of a type of the lower MAC/PHY layer.

For example, the context-aware information includes information required for providing all adaptive multimedia services, and can support the adaptive multimedia service by using only some parameters according to circumstances.

Further, according to exemplary embodiments of the present invention, the NAMB information can be generated for each stream or service (or session). When the NAMB information is generated for each service (session), an entity including an NAMB register has NAMB registers for each session. When the NAMB information is set in the unit of streams, the NAMB register can be configured for each stream. Also, in a case of transmitting an NAMB packet instead of using the NAMB register, the NAMB packet can be transmitted for each session or each stream.

Meanwhile, there are two methods to receive information from a lower layer. A first method is to start a direct measurement by using an Application Program Interface (API). A second method is to periodically or aperiodically store a measured value in a designated register by the lower layer and read the stored value in a desired time by an application layer. Exemplary embodiments of the present invention define types of the exchanged parameters and suggests schemes for expressing the parameters. Further, when there is a correlation between different contexts, a scheme of integrating the contexts is provided.

Figure 3A:
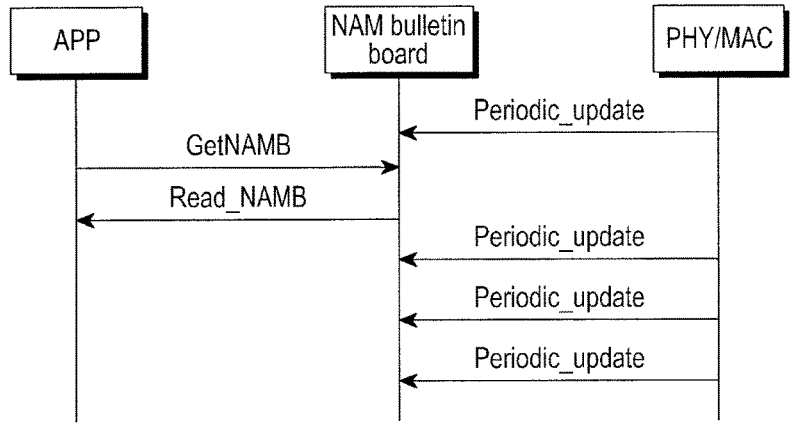
FIGS. 3A to 3C illustrate processes of exchanging Bulletin Board for Network Abstraction for MMT (NAMB) information between a higher layer and a lower layer according to an exemplary embodiment of the present invention.
Figure 3B:
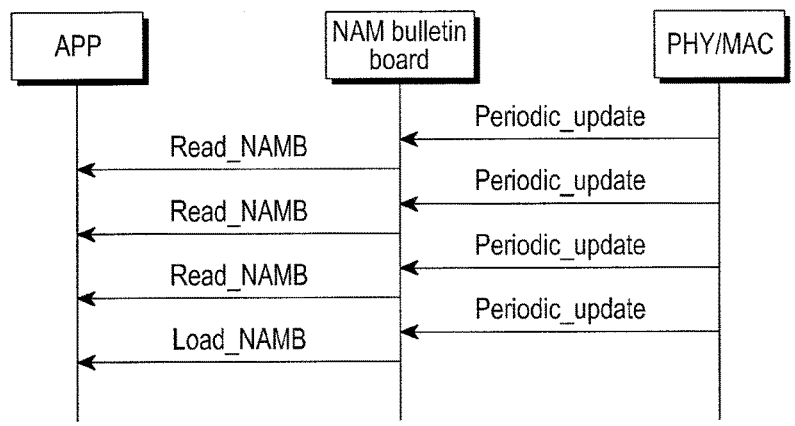
Figure 3C:
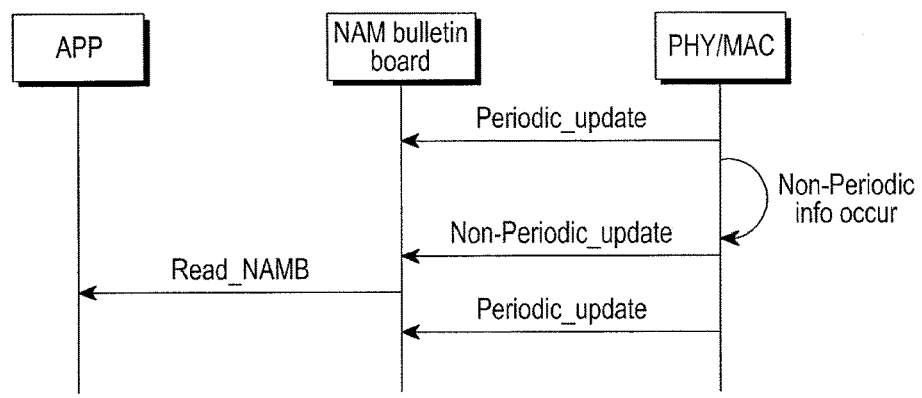

FIGS. 3A to 3C illustrate processes of exchanging NAMB information between a higher layer and a lower layer according to an exemplary embodiment of the present invention. As an example, the higher layer is the application layer, and the lower layer is the PHY/MAC layer.

Referring to FIGS. 3A to 3C, the NAMB information can be periodically or aperiodically generated. When the NAMB information is periodically generated in the lower layer, the higher layer can periodically identify the NAMB information. When the NAMB information is aperiodically generated, the higher layer can aperiodically identify the NAMB information.

According to exemplary embodiments of the present invention, the higher layer can periodically identify NAMB register information as shown in FIG. 3A or the higher layer can fetch the NAMB register information only when the NAMB register information is required as shown in FIG. 3B. According to exemplary embodiments of the present invention, as shown in FIG. 3C, the lower layer can aperiodically write information in the NAMB register and the aperiodic NAMB information is transferred to the higher layer.

According to exemplary embodiments of the present invention, the costs spent on providing the multimedia service of each available channel can be provided to a user through unit_price_per_byte information which is included in the network-aware information as well as the NAMB information so that the user can receive help in selecting the multimedia service.

Types and semantics of parameters defining the device-capability-aware information are as follows.
display_size: refers to a physical size ($H_d$, $V_d$) of a device. Vd is a number of lines and Hd is a number of pixels for each line.
number_of_audio: refers to a type (Cd) of an available audio.
available_channel_mode: refers to an available channel mode (CH) (e.g., 3G, WiFi, WiMAX, Bluetooth, and the like).

An acceptable video size in the device can be known through a display size of the device (e.g., a physical size of the device—$H_d$, $V_d$), an acceptable audio type can be known through information on a number of audio channels ($C_d$) and thus a suitable service can be performed, and a network type which can be supported by the device can be known through information on available communication channel modes (CH: 3G, WiFi, WiMAX, Bluetooth, and the like).

Types and semantics of parameters defining the user-preference-aware information are as follows.
expected_price: refers to a cost desired by a user in the multimedia service.
relative_quality_delta: refers to a parameter for up/down-controlling a video quality in consideration of the cost by the user.
selection_of_video_size: refers to a parameter (Hu, Vu) for indicating a display size selected by the user. The parameter cannot exceed the display size (Hd, Vd) supported by the device.
selection_of_audio: refers to an audio type ($C_u$) selected by the user. The parameter cannot exceed the audio type (Cd) supported by the device.
selection_of_temporal_location: refers to a parameter for supporting playback modes such as random access, fast forward, rewind, pause, and the like.
selection_of_spatial_location: it refers to a parameter defined for moving a position randomly, upwardly, rightwardly, or leftwardly in a panorama image (navigation panorama image).

According to exemplary embodiments of the present invention, information on an expected price is provided to know how much the user desires to spend to receive one multimedia service. Similarly, the user can require enhancing/degrading a video quality through information on a relative quality delta (positive delta: enhancing quality, negative delta: degrading quality) in consideration of the price. The video quality can be selected through information on selection of video quality according to a user preference (e.g., the selected display window size ($H_u$, $V_u$) cannot be larger than ($H_d$, $V_d$)), and an audio channel can be selected using information on a selection of video quality (e.g., the number of selected audio channels ($C_u$) cannot be larger $C_d$). The playback mode (e.g., random access, fast forward, rewind, pause, and the like) can be performed using information on selection of temporal location, and a desired position in a screen is designated and shown (e.g., move to random position, move left/right, move up/down, zoom in/out) by using information on a selection of spatial location (navigation panorama image).

Figure 4:
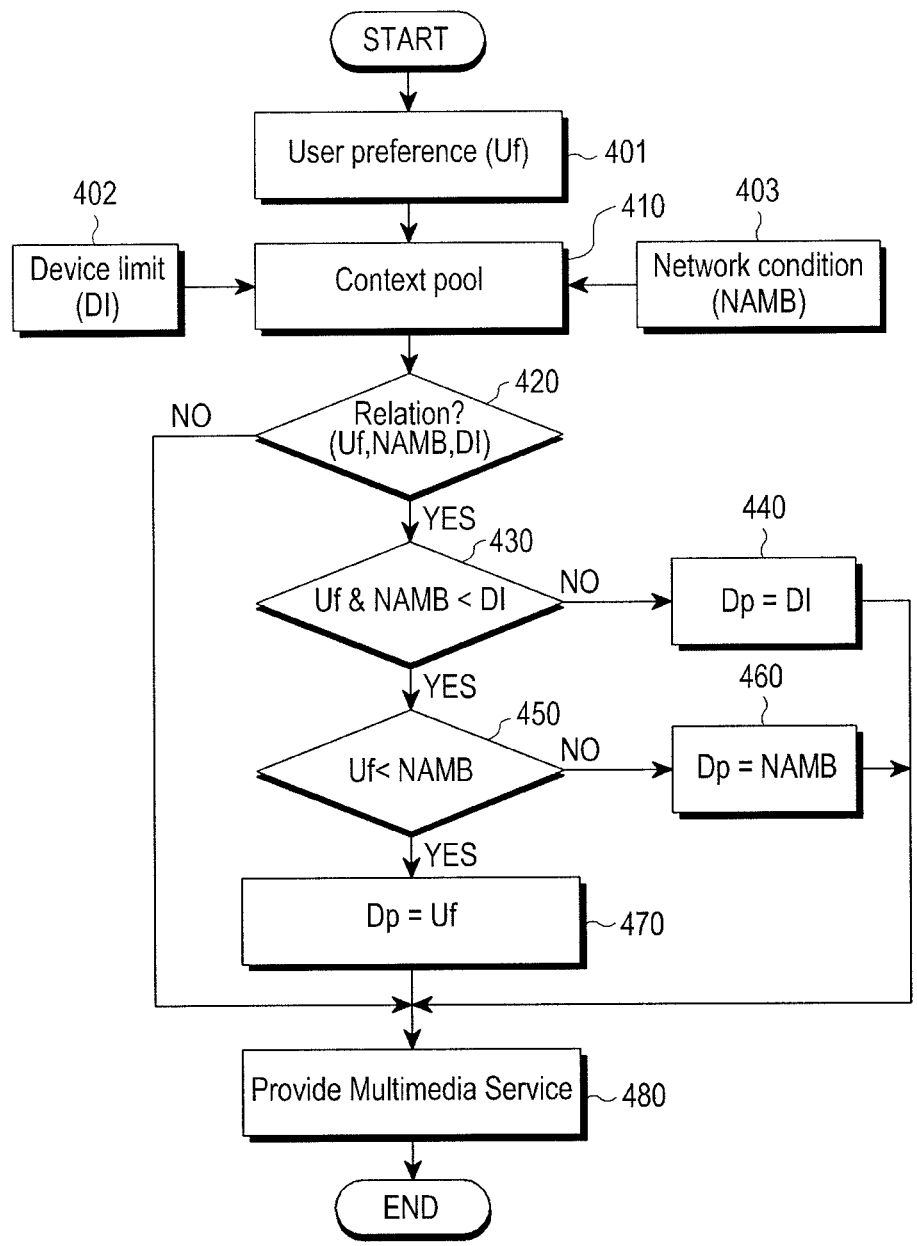
FIG. 4 is a flowchart illustrating a method of providing an adaptive multimedia service according to an exemplary embodiment of the present invention.

FIG. 4 is a flowchart illustrating a method of providing an adaptive multimedia service according to an exemplary embodiment of the present invention.

Referring to FIG. 4, in step 410, the context pool (e.g., the memory 110) stores network-aware information 403, user-preference-aware information 401, and device-capability-aware information 402 having the aforementioned parameters. Hereinafter, for convenience of the description, the network-aware information is defined as the NAMB, the user-preference-aware information is defined as the Uf (User preference), the device-capability-aware information is defined as the Dl (Device limit), and determined parameters are defined as Dp as shown in the drawings.

The controller 130 provides the adaptive multimedia service by using information stored in the memory 110 in steps 420 to 480.

For example, in step 420, the controller 130 determines whether there is a correlation among the Uf, the NAMB, and the Dl stored in the memory 110. Step 430 is performed when there is the correlation among the Uf, the NAMB, and the Dl, and step 480 is performed and thus the multimedia service is provided according to predetermined parameters when there is no correlation among the Uf, the NAMB, and the Dl.

The controller 130 identifies whether the Uf and the NAMB are satisfied with the Dl in step 430. For example, at step 430, the controller 130 determines whether the Uf and NAMB are respectively less than or equal to the Dl. Step 450 is performed when the Uf and the NAMB are satisfied with the Dl. Conversely, step 460 is performed and thus parameters provided to the multimedia service are determined according to the Dl when the Uf and the NAMB are not satisfied with the Dl.

The controller 130 identifies whether the Uf is satisfied with the NAMB in step 450. For example, at step 450, the controller 130 determines whether the Uf is less than or equal to the NAMB. When the Uf is satisfied with the NAMB, parameters provided to the multimedia service is determined according to the Uf in step 470. Conversely, when the Uf is not satisfied with the NAMB, parameters provided to the multimedia service are determined according to the NAMB in step 460.

Then, the controller 130 adaptively provides the multimedia service to the user according to the parameters determined in respective steps in step 480.

In an exemplary embodiment of the present invention, one user is receiving a multimedia service. If the user thinks that the cost spent on the multimedia service is expensive, then information on the cost spent on the multimedia service is provided as a parameter of the unit price per byte included in the network-aware information. Accordingly, exemplary embodiments of the present invention enable the user to be able to control the cost spent on the multimedia service by identifying the unit price per byte and controlling a relative quality delta or an expected price. Further, when the user requires a playback mode such as a fast forward or a rewind in receiving the multimedia service, the user can use the parameter of a selection of temporal location. Similarly, when the user receives a service of a panorama image, the user can select a desired position in the image or perform a function such as an enlargement/reduction by using the parameter of selection of spatial location.

According to exemplary embodiments of the present invention, the context-aware information can be QoS information requested by a user side. For example, when a state of a terminal is not suitable for receiving a service having a high QoS, the user can request a packet service having a low quality. In this case, the context-aware information corresponds to information generated by the user's terminal according to the request of the user.

In an example of integrating information having a correlation among the context-aware information, the user can control such that a provided video size is changed to a desired video size $(H_u, V_u)$. However, at this time, the video size selected by the user cannot exceed the video size $(H_d, V_d)$ supported by the device, and is represented by the following formula of min $\{(H_u, V_u), (H_d, V_d)\}$. Further, although the user can select desired audio information $(C_u)$, audio information only within an audio selection range $(C_d)$ in which the service can be provided is available, and is represented by the following formula of min$(C_u, C_d)$. Furthermore, the user's selection and the bit-rate (e.g., throughput) supported by the device cannot exceed the bit-rate parameter supported by the abstracted network, and are represented by the following formula of min $(b_u, b_d, b_n)$. Similarly, the user can arbitrarily select communication channels (e.g. 3G, WiFi, WiMAX, Bluetooth, and the like) which can be provided by the device. As described above, parameters having the correlation among parameters included in the network-aware information, the device-capability-aware information, and the user-preference-aware information can be integrated based on a rule similar to that of the above example.

Meanwhile, parameters related to the context-aware (device-capability, network-aware, user-preference-aware) information can be transferred to a service provider through an RTCP or an RTSP extended header as information for generating adaptive multimedia service data.

Representative effects according to configuration of exemplary embodiments of the present invention include the following:

Exemplary embodiments of the present invention can provide an adaptive multimedia service by providing integrated context-aware information available for all adaptive multimedia services and reflecting a user of multimedia data, a user's device, and a network state or requirement.

Further, exemplary embodiments of the present invention can efficiently use communication resources through a cross-layer-optimization by providing an integrated network abstract layer which can abstract information provided by different MAC/PHY layers for information exchanges between a higher protocol layer and a lower protocol layer.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable lap-top PC, a global positioning system (GPS) navigation, and devices such as a desktop PC, a high definition television (HDTV), an optical disc player, a set top box, and the like capable of wireless communication or network communication consistent with that disclosed herein.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for interfacing between an application layer and an underlying layer that constitute a network entity for transmission of media data in a communication system, the method comprising:
   measuring quality of service (QoS) information based on channel conditions and available bit-rates corresponding to each of heterogeneous networks, a jitter, and information on a state of a router buffer or a reception buffer at the underlying layer;
   providing the QoS information from the underlying layer to an application layer;
   determining a media data quality to optimize a delivery of the media data in a target network among the heterogeneous networks based on the provided QoS information at the application layer;
   providing the media data quality from the application layer to the underlying layer;
   generating the media data based on the provided media data quality at the underlying layer; and
   transmitting the generated media data via the target network at the underlying layer,
   wherein the channel conditions are indicated a degree of a delay and a loss on each of the heterogeneous networks.

2. The method of claim 1, wherein the QoS information is measured in the underlying layer and provided to the application layer, periodically or on request of the application layer.

3. An apparatus for interfacing between an application layer and an underlying layer that constitute a network entity for transmission of media data in a communication system, the apparatus comprising:
   at least one processor configured to:
      measure quality of service (QoS) information based on channel conditions and available bit-rates corresponding to each of heterogeneous networks, a jitter, and information on a state of a router buffer or a reception buffer at the underlying layer,
      provide the QoS information from the underlying layer to an application layer,
      determine a media data quality to optimize a delivery of the media data in a target network among the heterogeneous networks based on the provided QoS information at the application layer,
      provide the media data quality from the application layer to the underlying layer,
      generate the media data based on the provided media data quality at the underlying layer, and
      transmit the generated media data via the target network at the underlying layer,
   wherein the channel conditions are indicated a degree of a delay and a loss on each of the heterogeneous networks.

4. The apparatus of claim 3, wherein the QoS information is measured in the underlying layer and provided to the application layer, periodically or on request of the application layer.

* * * * *